US010115011B2

(12) United States Patent
Ouchi et al.

(10) Patent No.: US 10,115,011 B2
(45) Date of Patent: Oct. 30, 2018

(54) DOCUMENT TYPE RECOGNITION APPARATUS, IMAGE FORMING APPARATUS, DOCUMENT TYPE RECOGNITION METHOD, AND COMPUTER PROGRAM PRODUCT

(71) Applicants: Satoshi Ouchi, Tokyo (JP); Takuji Kamada, Kanagawa (JP)

(72) Inventors: Satoshi Ouchi, Tokyo (JP); Takuji Kamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/457,143

(22) Filed: Mar. 13, 2017

(65) Prior Publication Data

US 2017/0270359 A1    Sep. 21, 2017

(30) Foreign Application Priority Data

Mar. 18, 2016 (JP) ................................. 2016-055991

(51) Int. Cl.
| | |
|---|---|
| G06K 9/00 | (2006.01) |
| G06K 9/38 | (2006.01) |
| G06K 9/44 | (2006.01) |
| G06K 9/46 | (2006.01) |
| H04N 1/40 | (2006.01) |
| H04N 1/407 | (2006.01) |
| H04N 1/409 | (2006.01) |

(52) U.S. Cl.
CPC ........... *G06K 9/00463* (2013.01); *G06K 9/38* (2013.01); *G06K 9/44* (2013.01); *G06K 9/4642* (2013.01); *H04N 1/40062* (2013.01); *H04N 1/4074* (2013.01); *H04N 1/4092* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| 5,311,332 A | 5/1994 | Imao et al. |
| RE37,940 E | 12/2002 | Imao et al. |

(Continued)

FOREIGN PATENT DOCUMENTS

JP    2007-060619    3/2007

*Primary Examiner* — Andrew H Lam
(74) *Attorney, Agent, or Firm* — Harness, Dickey & Pierce P.L.C.

(57) ABSTRACT

A document type recognition apparatus includes an image region separation unit, a smoothing unit, an edge enhancement unit, a histogram creation unit, and a document type recognition unit. The image region separation unit outputs a signal indicative of each region obtained by separating an input image into a character region and a pattern region. The smoothing unit performs smoothing processing to remove halftone dots of a particular number of lines or greater in the pattern region of the input image. The edge enhancement unit outputs an image subjected to edge enhancement processing depending on an amount of edge on an edge portion of the character region in the input image subjected to the smoothing processing. The histogram creation unit creates a histogram of the image subjected to the edge enhancement processing. The document type recognition unit recognizes a document type of the input image by utilizing the histogram.

15 Claims, 17 Drawing Sheets

(56) References Cited

U.S. PATENT DOCUMENTS

| | | |
|---|---|---|
| 8,040,557 B2 | 10/2011 | Shibaki et al. |
| 2003/0058465 A1 | 3/2003 | Miyagi et al. |
| 2003/0095287 A1 | 5/2003 | Miyagi et al. |
| 2007/0025627 A1 | 2/2007 | Hasegawa et al. |
| 2008/0144975 A1* | 6/2008 | Shibaki ................ H04N 1/4072 382/299 |
| 2009/0147313 A1 | 6/2009 | Miyagi et al. |
| 2012/0057795 A1* | 3/2012 | Konishi .................. G06K 9/32 382/195 |
| 2013/0243321 A1* | 9/2013 | Shimazaki ............... G06K 9/46 382/170 |

* cited by examiner

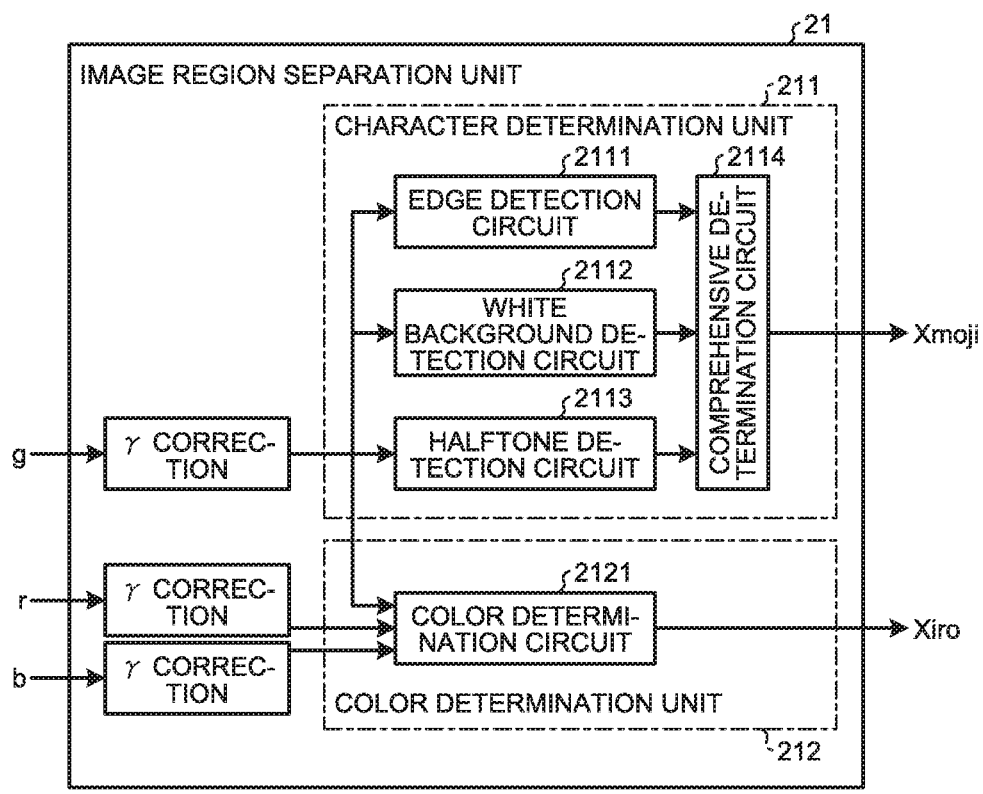

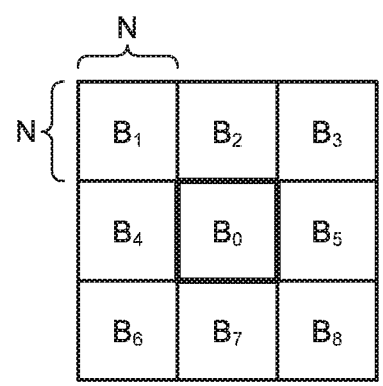

FIG.8

| 0 | -1 | 0 |
|---|----|---|
| -1 | 4 | -1 |
| 0 | -1 | 0 |

FIG.9

$$f\left(\text{Max}\left(\begin{array}{|c|c|c|c|c|}\hline 1 & 1 & 1 & 1 & 1 \\ \hline 1 & 1 & 1 & 1 & 1 \\ \hline 0 & 0 & 0 & 0 & 0 \\ \hline -1 & -1 & -1 & -1 & -1 \\ \hline -1 & -1 & -1 & -1 & -1 \\ \hline\end{array}\cdot I,\begin{array}{|c|c|c|c|c|}\hline 1 & 1 & 0 & -1 & -1 \\ \hline 1 & 1 & 1 & -1 & -1 \\ \hline 1 & 1 & 0 & -1 & -1 \\ \hline 1 & 1 & 0 & -1 & -1 \\ \hline 1 & 1 & 0 & -1 & -1 \\ \hline\end{array}\cdot I\right)\right)$$

1. TRUE BLACK COLOR
2. BLACK COLOR
3. NEUTRAL COLOR
4. GRAY (NEWSPAPER GROUND) COLOR
5. WHITE COLOR

|  | RESOLUTION | | | |
|---|---|---|---|---|
|  | BACK-GROUND | FORE-GROUND | COLOR CHARACTER | BLACK CHARACTER |
| ANOTHER-TYPE DOCUMENT | 1/2 | 1/8 | 1 | 1 |
| PALE DOCUMENT | 1/2 | 1/8 | 1 | 1 |
| NEWSPAPER DOCUMENT | 1/4 | 1/8 | 1 | 1 |
| CHARACTER ONLY DOCUMENT | 1/4 | 1/8 | 1 | 1 |

*1: HALFTONE SEPARATION RESULT 1
*2: HALFTONE SEPARATION RESULT 2

FIG.22

|  | RESOLUTION | | | |
| --- | --- | --- | --- | --- |
|  | BACK-GROUND | FORE-GROUND | COLOR CHARACTER | BLACK CHARACTER |
| PALE DOCUMENT (a) | 1/2 | 1/8 | 1 | 1 |
| PALE DOCUMENT (b) | 1/2 | 1/8 | 1 | 1 |
| PALE DOCUMENT (c) | 1/2 | 1/8 | 1 | 1 |
| PALE DOCUMENT (d) | 1/4 | 1/8 | 1 | 1 |
| PALE DOCUMENT (e) | 1/8 | 1/8 | 1 | 1 |
| PALE DOCUMENT (f) | 1/8 | 1/8 | 1 | 1 |

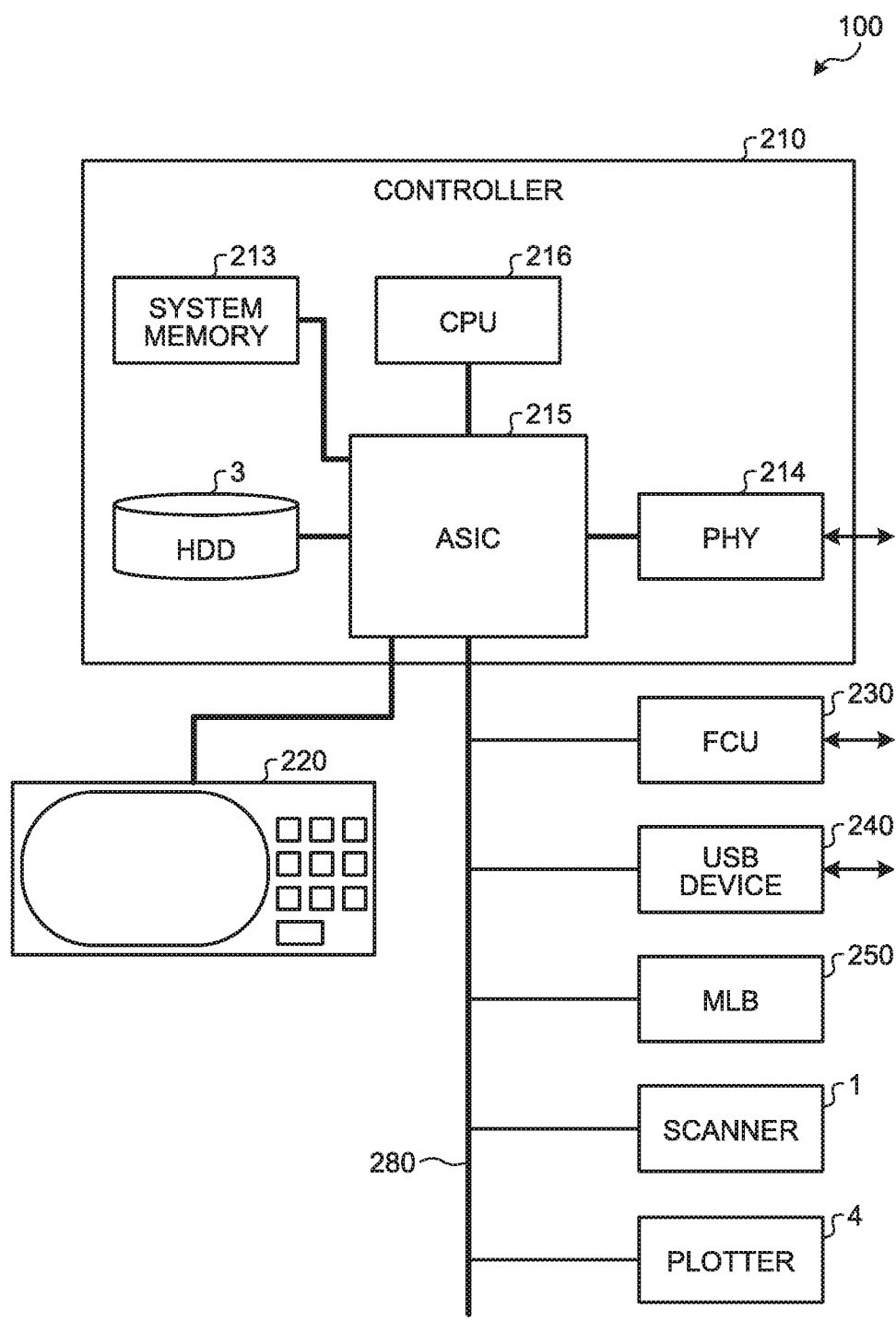

DOCUMENT TYPE RECOGNITION APPARATUS, IMAGE FORMING APPARATUS, DOCUMENT TYPE RECOGNITION METHOD, AND COMPUTER PROGRAM PRODUCT

CROSS-REFERENCE TO RELATED APPLICATIONS

The present application claims priority under 35 U.S.C. § 119 to Japanese Patent Application No. 2016-055991, filed on Mar. 18, 2016. The contents of which are incorporated herein by reference in their entirety.

BACKGROUND OF THE INVENTION

1. Field of the Invention

The present invention relates to a document type recognition apparatus, an image forming apparatus, a document type recognition method, and a computer program product.

2. Description of the Related Art

The high-compression PDF is known as a technique for increasing the compression rate and the image quality in the PDF. The high-compression PDF is known to separate an image into image regions, i.e., the character region and the pattern region, to apply compression processing (for example, MMR or JPEG) suitable for each of the character region and the pattern region, thereby achieving high compression.

Furthermore, the technique for determining the attribute of an entire document is typically said to be the document type recognition technique. It is also known that at the time of creating a high-compression PDF file, the document type is determined by the document type recognition technique to thereby switch processing to suit the document type (for example, to select the threshold value for binarizing processing or an appropriate compression method).

At the time of creating a high-compression PDF file, the following document types are expected to be improved in image quality by switching processing to suit the document type determined by the document type recognition technique.

Character only document
Newspaper document
Pale document

In particular, due to a recent upsurge of interest in environmental awareness, such a case has been increased in which copiers output copies in a toner-save mode when reproducing images. When an image outputted in the toner save mode as mentioned above is scanned as a document so as to create a high-compression PDF file, the document is naturally "a pale document."

However, known document type recognition techniques require determination circuits for each document type, thus causing high processing costs. Furthermore, known document type recognition techniques and compression techniques supports "the character only document" and "the newspaper document," but does not support another document type (for example, "the pale document").

SUMMARY OF THE INVENTION

According to one aspect of the present invention, a document type recognition apparatus includes an image region separation unit, a smoothing unit, an edge enhancement unit, a histogram creation unit, and a document type recognition unit. The image region separation unit outputs a signal indicative of each region obtained by separating an input image into a character region and a pattern region. The smoothing unit performs smoothing processing to remove halftone dots of a particular number of lines or greater in the pattern region of the input image. The edge enhancement unit outputs an image subjected to edge enhancement processing depending on an amount of edge on an edge portion of the character region in the input image on which the smoothing processing has been performed. The histogram creation unit creates a histogram of the image subjected to the edge enhancement processing. The document type recognition unit recognizes a document type of the input image by utilizing the histogram.

BRIEF DESCRIPTION OF THE DRAWINGS

FIG. 2 is a block diagram illustrating a configuration of an image region separation unit;

FIG. 3 is a view illustrating the direction in which a comparison is made between pixels in a matrix of M×M pixels;

FIG. 4 is a view illustrating an example block of N×N pixels;

FIG. 5 is a view illustrating the relation between a focused block and surrounding blocks;

FIG. 8 is a schematic view exemplifying Laplacian;

FIG. 9 is a schematic view exemplifying an edge quantity filter;

FIG. 22 is a view illustrating the resolution of each layer to be converted depending on each pale document type pattern; and FIG. 23 is a block diagram illustrating an example hardware configuration of an image forming apparatus.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
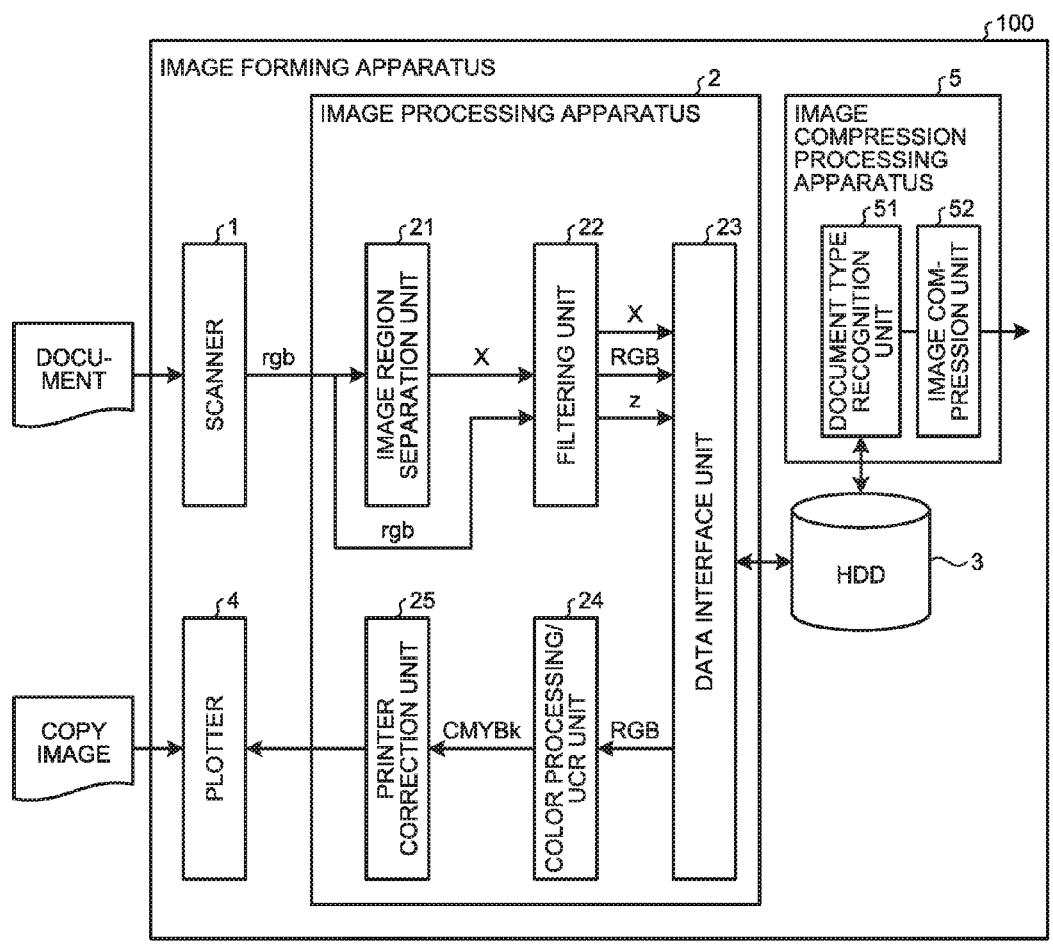
FIG. 1 is a block diagram illustrating a configuration of an image forming apparatus according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to classify the attributes of documents (for example, the character only document, the newspaper document, the pale document, and the another-type document) in a simplified configuration using the same determination scheme.

Embodiments will be described in detail below with reference to the accompanying drawings. By way of example, the embodiments relate to a digital, color image forming apparatus as the document type recognition apparatus, and a description will be made to a multifunctional apparatus that has at least two functions of the copy function, the printer function, the scanner function, and the facsimile function.

First Embodiment

FIG. 1 is a block diagram illustrating a configuration of an image forming apparatus 100 according to a first embodiment. First, referring to FIG. 1, a description will be made mainly to an inbound signal and an outbound signal of each unit that constitutes the image forming apparatus 100, and then the inside of each unit will be detailed later as required.

As illustrated in FIG. 1, the image forming apparatus 100 is provided with a scanner 1, an image processing apparatus 2, a hard disk drive (HDD) 3, a plotter 4, and an image compression processing apparatus 5 for producing a high-compression PDF file (high-compression image file).

The scanner 1 reads image data from a document. The scanner 1 sends the image data having been read (r, g, and b signals each having 8 bits after A/D conversion; reflectivity linear signals which change linearly relative to the reflectivity) to the image processing apparatus 2.

The image processing apparatus 2 is provided with an image region separation unit 21, a filtering unit 22, a data interface unit 23, a color processing/UCR unit 24, and a printer correction unit 25.

The image region separation unit 21 separates the image data (r, g, b), which has been read by the scanner 1, into a character region and a pattern region. The image region separation unit 21 outputs an X signal, which is a 2-bit signal (a character/non-character region signal or a color/non-color region signal). The X signal is outputted via the filtering unit 22 and the data interface unit 23 to the HDD 3 and saved therein.

The filtering unit 22 applies spatial filtering to the image data (RGB) having been read by the scanner 1. The output (an RGB signal and a z-signal) to which the spatial filtering has been applied by the filtering unit 22 is outputted via the data interface unit 23 to the HDD 3 and saved therein. As will be detailed later, the z-signal is indicative of an edge region.

In addition, the RGB signal to which the spatial filtering has been applied is sent via the data interface unit 23 to the color processing/UCR unit 24. The color processing/UCR unit 24 converts the R, G, and B signals each having 8 bits into an image signal (C, M, Y, and Bk signals each having 8 bits) that is a control signal for the plotter 4 based on a predetermined conversion formula and then sends the resulting signal to the printer correction unit 25.

The printer correction unit 25 performs the $\gamma$ correction processing and the pseudo gray-scale processing, which reflect the gradation properties of the plotter 4, on the C, M, Y, and Bk image signals, for output to the plotter 4.

Then, the plotter 4 that is a transfer printing unit transfer-prints an image signal outputted from the image processing apparatus 2.

Next, a description will be made to the image region separation unit 21 of the image processing apparatus 2. Here, FIG. 2 is a block diagram illustrating a configuration of the image region separation unit 21. As illustrated in FIG. 2, the image region separation unit 21 performs one-dimensional conversion processing (the $\gamma$ correction processing) for keeping a gradation balance for each color on the data having been read by the scanner 1 (r, g, and b signals each color having 8 bits after A/D conversion, which change linearly relative to the reflectivity).

Furthermore, the image region separation unit 21 is provided with a character determination unit 211 and a color determination unit 212. After the $\gamma$ correction, a density linear signal which changes linearly relative to the density (RGB signal; a signal value indicative of white is defined to be 0) is sent to the character determination unit 211 and the color determination unit 212.

The character determination unit 211 is provided with an edge detection circuit 2111, a white background detection circuit 2112, a halftone detection circuit 2113, and a comprehensive determination circuit 2114.

The edge detection circuit 2111 performs an edge determination on a density linear signal (G), which changes linearly relative to the density), after the $\gamma$ correction (to be determined by the continuity of a white pixel and a black pixel) so as to detect an edge of a line drawing candidate, and then outputs the result (hereafter referred to as "the edge detection result") to the comprehensive determination circuit 2114. For example, the edge detection circuit 2111 employs the continuity or the pattern of a black pixel or a white pixel resulting from the ternarizing of the input image signal so as to separate the line drawing such as of the character and the halftone, thereby detecting an edge constituting a line drawing candidate. The edge detection circuit 2111 provides a one-pixel one-bit output, which makes the detected edge region pixel active.

The white background detection circuit 2112 determines whether the density linear signal (G) after the $\gamma$ correction is indicative of a white background or a non-white background, and then outputs the result to the comprehensive determination circuit 2114. For example, the white background detection circuit 2112 determines that the signal is indicative of the white background when an input image signal binarized with a predetermined threshold value is separated into a white pixel and a black pixel and then found to have a white pixel in both horizontal and vertical directions of a focused pixel. At this time, by controlling the size of the upper and lower and the left and right reference areas, it is possible to determine that a character edge portion having a desired line width or less is a white background, and a character edge portion exceeding the desired line width is a non-white background. The output from the white background detection circuit 2112 makes the white background active.

The halftone detection circuit 2113 makes a halftone determination of each pixel of the density linear signal (G) after the γ correction (the determination by the repeated pattern of mountain/valley peak pixels in the image), and then outputs the result to the comprehensive determination circuit 2114.

More specifically, the halftone detection circuit 2113 sequentially applies, to each pixel of the density linear signal (G) after the γ correction, matrices of predetermined M×M pixels, for example, as illustrated in (a) to (c) of FIG. 3, a 3×3 pixel matrix (M=3), a 4×4 pixel matrix (M=4), or a 5×5 pixel matrix (M=5). Then, the halftone detection circuit 2113 detects whether the center pixel $m_0$ of each matrix (see (a) to (c) of FIG. 3) is an extreme indicative of the mountain or valley of a change in density from the density relations with the surrounding pixels $m_1$ to $m_i$. In addition, the halftone detection circuit 2113 divides the image in blocks B, each of which includes N×N pixels (where N>M), for example, 9×9 pixels (N=9) as illustrated in FIG. 4.

Then, the halftone detection circuit 2113 counts, in each block, each of the number of extreme pixels indicative of a mountain and the number of extreme pixels indicative of a valley, and then determines the number of extreme pixels having a greater count as the number of extreme pixels in the block. Subsequently, from the relation between the number of extreme pixels $P_0$ in a focused block $B_0$ illustrated in FIG. 5 and the numbers of extreme pixels P of each of the surrounding blocks $B_1$ to $B_8$ around the block $B_0$ in the horizontal, vertical, and diagonal directions, the halftone detection circuit 2113 determines whether the center pixel $n_0$ of the focused block $B_0$ (see FIG. 4) or all the pixels $n_0$ to $n_{80}$ in the focused block $B_0$ belong to a halftone region. The output of the halftone detection circuit 2113 makes the halftone region active.

The comprehensive determination circuit 2114 outputs, as an X signal, a determination result $X_{moji}$ (character/non-character (pattern)) that defines the focused pixel as a character region when the focused pixel is made active by the edge detection circuit 2111, made active by the white background detection circuit 2112, and made non-active by the halftone detection circuit 2113.

The color determination unit 212 is provided with a color determination circuit 2121. The color determination circuit 2121 determines whether with respect to the density linear signals (R, G, and B) after the γ correction, the focused pixel block (4×4 pixels) is a chromatic color block or an achromatic color block.

More specifically, for example, the color determination circuit 2121 detects, as a chromatic pixel, any pixel that meets Max (|R−G|, |G−B|, |B−R|)>th (th is a predetermined threshold value), and then outputs, as an X signal, a determination result $X_{iro}$ (chromatic color/achromatic color) which indicates that a block of 4×4 pixels is an active block if there exists even only one chromatic pixel in the block.

Figure 6:
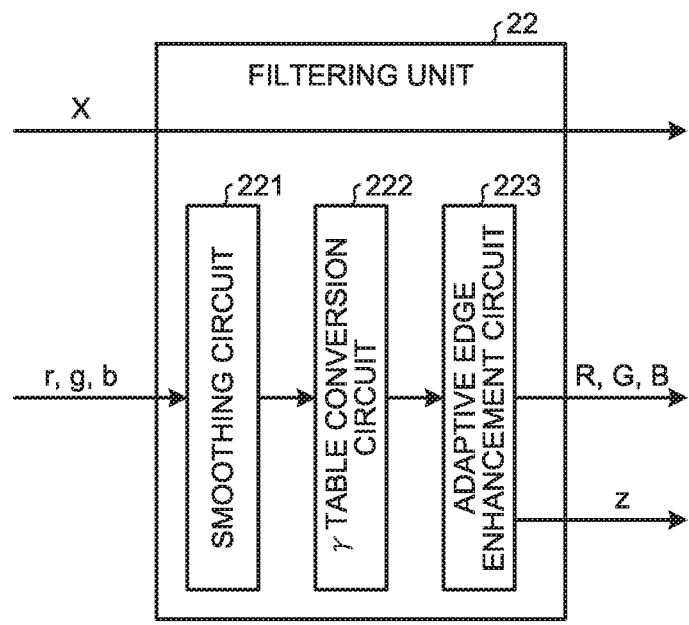
FIG. 6 is a block diagram illustrating a configuration of a filtering unit.

Next, a description will be made to the filtering unit 22 of the image processing apparatus 2. FIG. 6 is a block diagram illustrating the configuration of the filtering unit 22. As illustrated in FIG. 6, the filtering unit 22 is provided with a smoothing circuit 221 serving as a smoothing unit, a γ table conversion circuit 222, and an adaptive edge enhancement circuit 223 serving as an edge enhancement unit. The filtering unit 22 performs smoothing processing on a pattern region of an image with special attention focused on halftone. The filtering unit 22 also performs edge enhancement processing on an edge portion of the image with special attention focused on character edges.

The smoothing circuit 221 performs, on the image data (r, g, and b signals, which change linearly relative to reflectivity) having been read by the scanner 1, such spatial filtering that removes halftone dots of a particular number of lines or greater. More specifically, the smoothing circuit 221 performs smoothing on the image data having been read by the scanner 1. The smoothing filter has such a property that allows halftone frequencies that exceed 100 lines (3.91 ps/mm) to be generally removed near a cutoff frequency of 100 lines and any frequencies lower than that frequency to be almost perfectly left. This makes it possible to prevent the occurrence of moiré in the halftone document and as well reduce noise of the picture document.

The γ table conversion circuit 222 performs the one-dimensional conversion processing (the γ correction processing) to convert a reflectivity linear signal into a density linear signal.

The adaptive edge enhancement circuit 223 does not perform an edge enhancement on the entirety of an image but performs such edge enhancement processing that enhances only the edge portion of the image. The entire image is not edge enhanced because the halftone dots having been removed by the smoothing circuit 221 would otherwise be restored.

The filtering unit 22 changes the attribute of a signal by the smoothing processing and the edge enhancement processing, thereby reproducing a character region so as to be clear and thin while removing halftone dots with efficiency.

Figure 7:
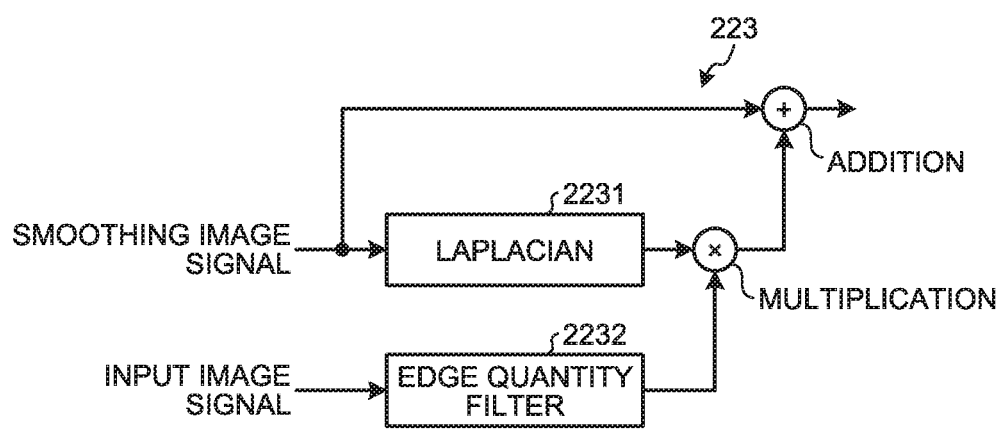
FIG. 7 is a block diagram illustrating a configuration of an adaptive edge enhancement circuit.

Here, FIG. γ is a block diagram illustrating the configuration of the adaptive edge enhancement circuit 223. As illustrated in FIG. 7, the adaptive edge enhancement circuit 223 extracts an edge from a smoothing image signal (density linear signal) by Laplacian (edge enhancement filter) 2231. FIG. 8 is a schematic view exemplifying the Laplacian 2231. The Laplacian 2231 quadruples a focused pixel and takes the differences between the focused pixel and the four adjacent pixels so as to extract an edge. As described above, the edge extraction based on the density linear signal is effective to reproduce a character on halftone and a character on a color ground so as to be thin and clear.

The Laplacian 2231 applies, to the region having been detected as an edge, a filter with such a property as to have power over an entire spatial frequency region, thereby providing a high-quality character image on halftone.

Furthermore, the adaptive edge enhancement circuit 223 employs an edge quantity filter 2232 to compute the amount of edge of the input image signal (r, g, and b signals; reflectivity linear signals) having been read by the scanner 1. FIG. 9 is a schematic view exemplifying the edge quantity filter 2232. The edge quantity filter 2232 illustrated in FIG. 9 is an example in which a primary differential filter is applied to a focused pixel and the surrounding pixels. That is, the edge quantity filter 2232 takes the absolute value of the primary differential of input image data I in the x direction and the absolute value of the primary differential thereof in the y direction so as to employ the maximum value as the amount of edge, and f is a function for normalization with the maximum value 1.

The edge quantity filter 2232 and the Laplacian 2231 differ from each other on the spatial frequency in that at a higher-frequency region, the power of the edge quantity filter 2232 is less than the power of the Laplacian 2231. For characters on halftone, this is to increase the amount of edge of a character edge on halftone without detecting halftone as an edge, as possible. Thus, this allows the halftone to be smoothed, providing almost no amount of edge in a high frequency region.

The adaptive edge enhancement circuit 223 multiplies the output of the Laplacian 2231 and the output of the edge quantity filter 2232 together as well as adds the focused pixel and the multiplied values together in an adder so as to edge enhance the focused pixel.

Furthermore, the adaptive edge enhancement circuit 223 binarizes the output value of the edge quantity filter 2232 with an appropriate threshold value, and then sends a signal (z) indicative of an edge region together with the RGB signal and the X signal to the data interface unit 23 so as to use the signal in creating a histogram in a downstream document type recognition unit 51.

In a manner as described above, the adaptive edge enhancement circuit 223 performs processing to provide well-defined images by imparting contrast between characters on halftone and characters on a color ground and enhancing an edge in a pattern such as halftone and pictures. In contrast to this, the adaptive edge enhancement circuit 223 performs no edge enhancement on other halftone regions than those mentioned above, thereby enabling graininess-free smooth images to be reproduced.

That is, the filtering unit 22 allows halftone to be smoothed and not detected as an edge and is thus not subjected to edge enhancement, while allowing halftone around a character to be smoothed to enhance a character edge, thereby making it possible to provide a well-defined image.

Subsequently, the image compression processing apparatus 5 will be described. As illustrated in FIG. 1, the image compression processing apparatus 5 is provided with the document type recognition unit 51 and an image compression unit 52.

First, the document type recognition unit 51 will be described.

Prior to the image compression in the image compression unit 52, the document type recognition unit 51 utilizes a histogram of pixel values of the document according to an output (the RGB signal, the z-signal) subjected to spatial filtering by the filtering unit 22 so as to determine which one of the four types below a focused document is. In addition, the document type recognition unit 51 also determines whether there is a possibility of a hollow character being found in a newspaper document. The determination of the possibility of there being a hollow character is not limited to the newspaper document, but may also be made on a pale document that is an image outputted in a toner save mode or an another-type document that is an image such as a pattern.

Figure 10:
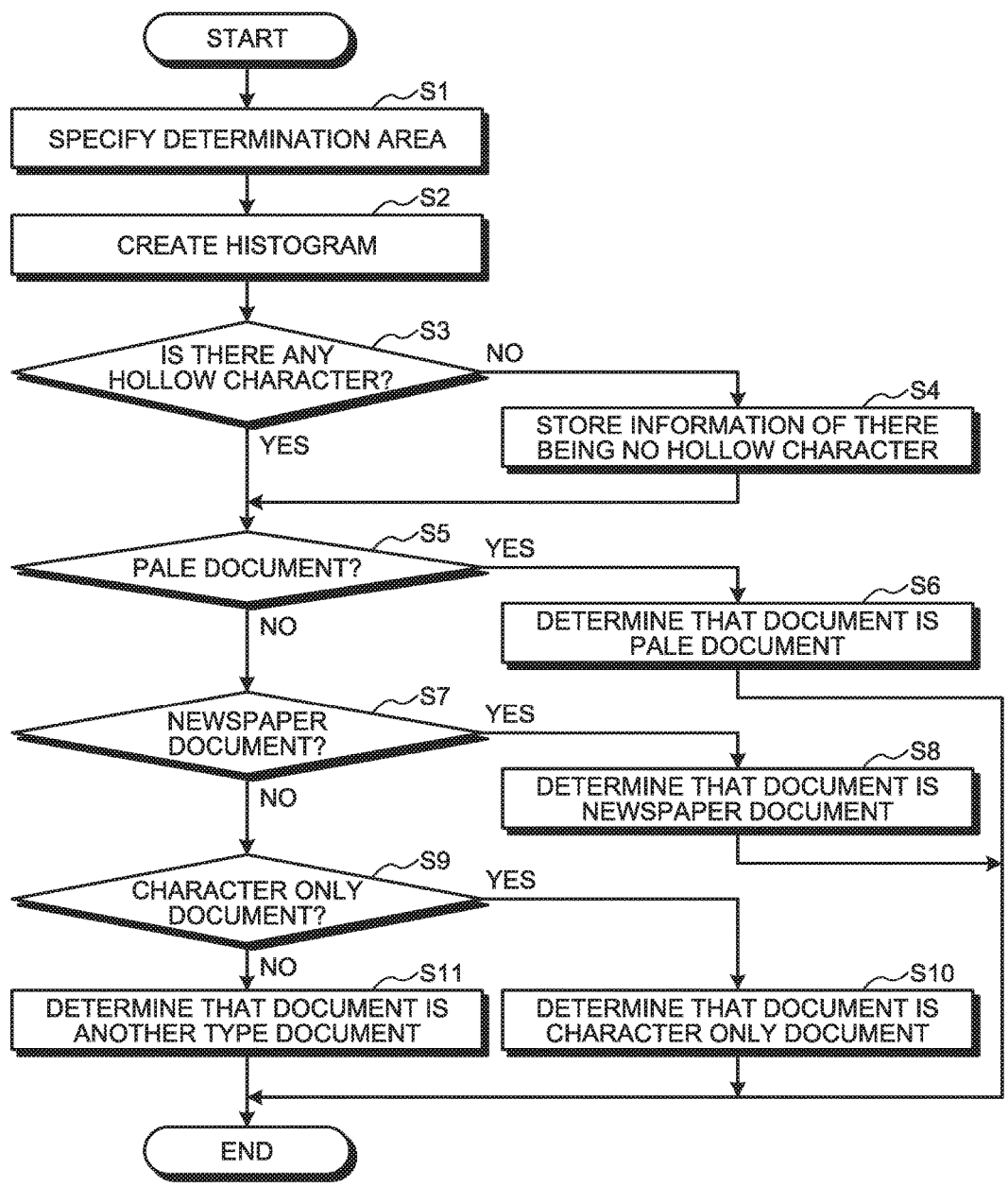
FIG. 10 is a flowchart schematically illustrating the flow of document type recognition processing in a document type recognition unit.

Character only document
Newspaper document (with hollow character)
Newspaper document (without hollow character)
Pale document
Another-type document FIG. 10 is a flowchart schematically illustrating the flow of the document type recognition processing in the document type recognition unit 51.

Figure 11:
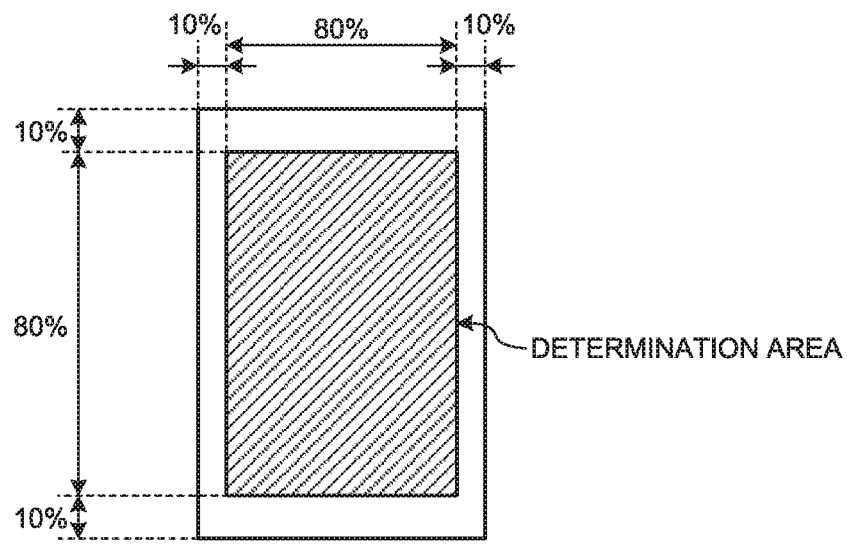
FIG. 11 is a schematic diagram illustrating a determination area on a document to be used for creating a histogram.

As illustrated in FIG. 10, first, the document type recognition unit 51 specifies a determination area on a document to be subjected to document type recognition (step S1). More specifically, the document type recognition unit 51 specifies the determination area on the document to be used in subsequent step S2 for creating a screenful histogram. There are two areas on the document that are not to be used for creating a histogram. FIG. 11 is a schematic diagram illustrating a determination area on a document to be used to create a histogram. As illustrated in FIG. 11, one is an area 10% from each of the horizontal and vertical ends of the document. The other to be excluded is pixels with the z-signal indicative of an edge region being active, that is, an edge portion of an image on the document. The former eliminates, for example, the inclusion of a shadow into the document, while the latter eliminates the inclusion of an intermediate pixel between a character and a background portion. The shadow of the document and the intermediate pixel between a character and a background portion can be possibly erroneously determined as a pattern though those are not a pattern, thus being eliminated from the determination area in advance.

Figure 12:
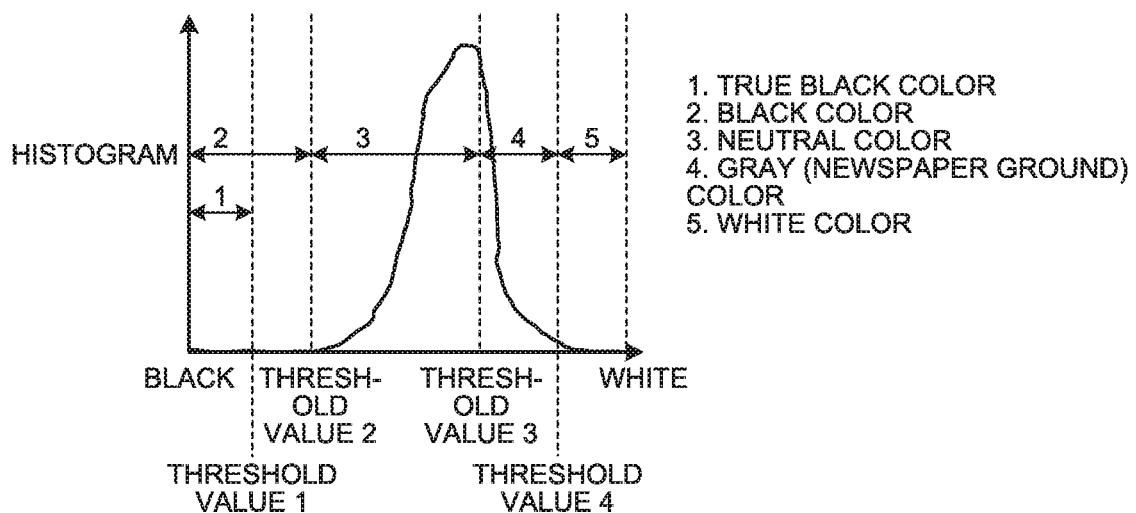
FIG. 12 is a view illustrating an example of creating a histogram.

Subsequently, the document type recognition unit 51 creates a histogram after having quantized the pixel value of a focused pixel with a plurality of threshold values (step S2). That is, the document type recognition unit 51 also functions as a histogram creation unit. FIG. 12 is a view illustrating an example of creating a histogram. As illustrated in FIG. 12, the document type recognition unit 51 counts the number of pixels and creates a histogram for each density in the determination area on the document of the output (the RGB signal, the z-signal) to which the spatial filtering has been applied in the filtering unit 22, and then determines the peak value from the created histogram. As illustrated in FIG. 12, the document type recognition unit 51 quantizes density with four threshold values (a threshold value 1 to a threshold value 4) which are determined through experiments, for example, and classifies the results as illustrated below:

1. True black color
2. Black color
3. Neutral color
4. Newspaper ground color (gray)
5. White color Here, the methods for determining each threshold value will be described below.

Threshold values of True black color and Black color
The threshold value 1 for specifying "1. True black color" is made lower than the character color of the newspaper (which influences the determination of newspaper document).

Threshold Values of Black Color and Neutral Color
The character color of the newspaper is specified so as to be classified into "2. Black color" (which influences the determination of newspaper document).
The character color (particularly, black character) of the character only document is specified so as to be classified into "2. Black color" (which influences the character only document).

The black character of the pale document is specified so as to be classified into "3. Neutral color" (which influences the determination of pale document).

Threshold Values of Neutral Color and Newspaper Ground Color
The newspaper ground color is specified so as to be classified into "4. Newspaper ground color" (which influences the determination of newspaper document).

Threshold Values of Newspaper Ground Color and White Color

The white ground is specified so as to be classified into "5. White color" (which influences the determination of character only document).

The hollow character is specified so as to be classified into "5. White color" (which influences the determination of hollow character).

Subsequently, the document type recognition unit 51 determines whether there is a hollow character (step S3). In the character region, the hollow character is bolder than the black character, and is counted as "5. White color" by the edge portion of the image being removed in identifying the determination area mentioned above (step S1). In this context, by utilizing this property, the document type recognition unit 51 determines that there is a hollow character when the character is counted as "5. White color" in the character region (Yes in step S3).

If it is determined that there is no hollow character (No in step S3), the document type recognition unit 51 temporarily stores the information of there being no hollow character (or white ground) so as to use the information at the time of detecting the hollow character of the newspaper document, the pale document, or the another-type document (step S4).

Subsequently, the document type recognition unit 51 determines whether the document is the pale document (step S5). In the pale document, "3. Neutral color" to "5. White color" are dominant, whereas "1. True black color" and "2. Black color" are less dominant. In this context, by utilizing this property, the document type recognition unit 51 performs determination on the respective count values with the threshold values. If the document type recognition unit 51 determines that the document is the pale document (Yes in step S5), the process proceeds to step S6 to define the type of the document as "the pale document."

Subsequently, if it is determined that the document is not the pale document (No in step S5), then the document type recognition unit 51 determines whether the document is the newspaper document (step S7). In the newspaper document, "4. Newspaper ground color" is dominant, whereas "1. True black color" and "3. Neutral color" are less dominant. In this context, by utilizing this property, the document type recognition unit 51 performs determination on the count values with the threshold values. If the document type recognition unit 51 determines that the document is the newspaper document (Yes in step S7), the process proceeds to step S8 to define the type of the document as "the newspaper document."

Subsequently, if it is determined that the document is not the newspaper document (No in step S7), the document type recognition unit 51 determines whether the document is the character only document (step S9). In the character only document, "1. True black color", "2. Black color", and "5. White color" are dominant, whereas "3. Neutral color" and "4. Newspaper ground color" are less dominant. In this context, by utilizing this property, the document type recognition unit 51 performs determination on the count values with the threshold values. If the document type recognition unit 51 determines that the document is the character only document (Yes in step S9), the process proceeds to step S10 to define the type of the document as "the character only document."

On the other hand, if it is determined that the document is not the character only document (No in step S9), the document type recognition unit 51 proceeds to step S11 to define the type of the document as "the another-type document." That is, when the document is determined to be not the pale document, nor the newspaper document, nor the character only document, the document type recognition unit 51 determines that the document is the another-type document.

Next, the image compression unit 52 will be described. The image compression unit 52 is a device for creating a high-compression PDF file.

The image compression unit 52 receives the determination result $X_{moji}$ (character/non-character (pattern)) and the determination result $X_{iro}$ (chromatic color/achromatic color) from the image region separation unit 21, which have been temporarily saved in the HDD 3, and the density linear signal (the RGB signal) after the γ correction, so as to create data for the high-compression PDF.

Next, a description will be made to the creation of the high-compression PDF file in the image compression unit 52 which has received the document type recognition result in the document type recognition unit 51.

First, the outline of the high-compression PDF will be described.

The high-compression PDF is an image compression technique for creating a high-compression PDF file from an image that includes the line drawing such as a character. Here, the line drawing refers to the character and an object expressed by lines that is desirably treated in the same manner as the character. It is to be understood that even an object which is expressed by lines but may be desirably treated as the pattern is not included in the line drawing but in the pattern. The pattern refers to an object other than the line drawing, that is, an object such as a picture that is expressed by halftone or an object such as graphics that are not desirably treated in the same manner as the character.

Figure 13:
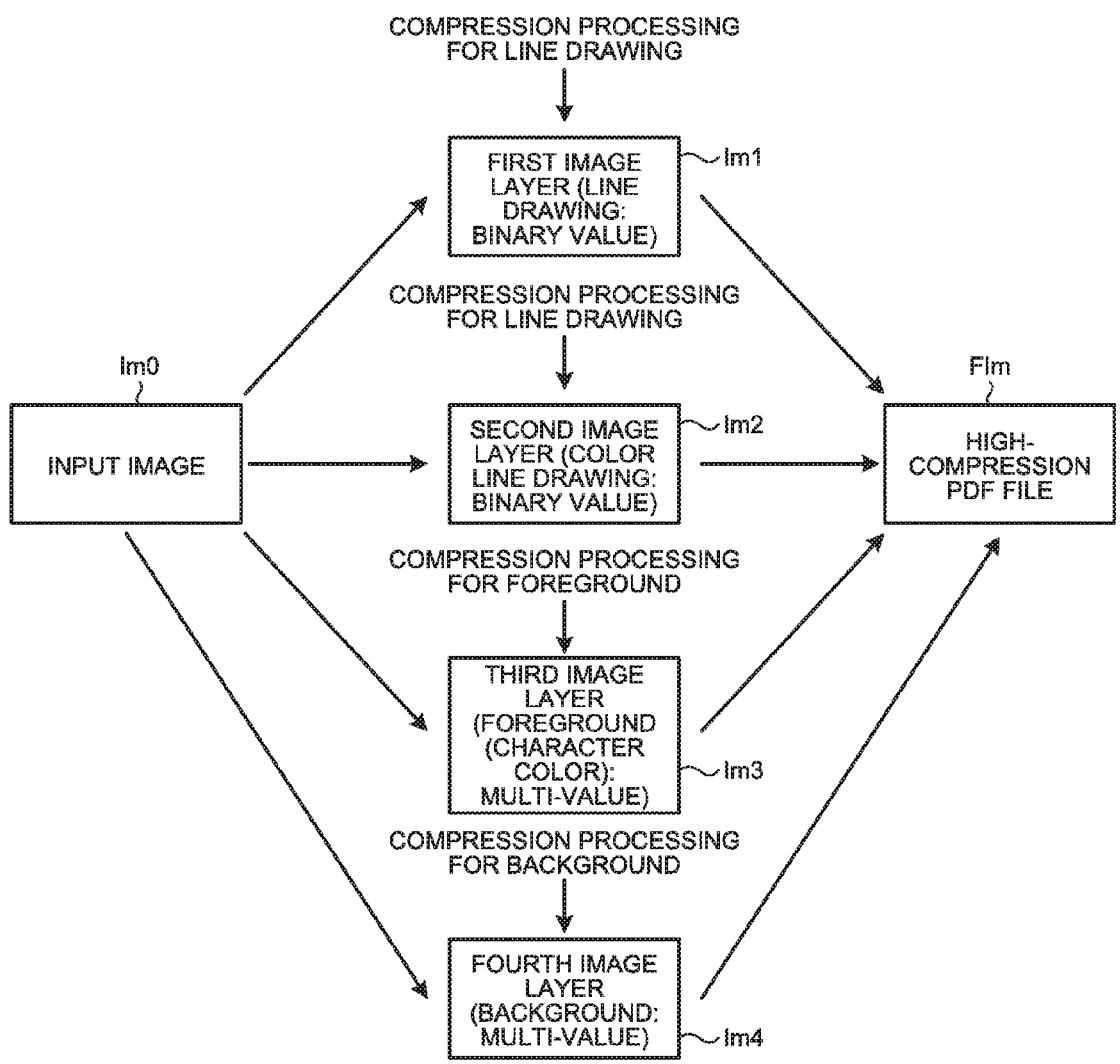
FIG. 13 is an explanatory schematic view illustrating the procedure of processing a high-compression PDF.

FIG. 13 is an explanatory schematic view illustrating the processing procedure of the high-compression PDF. To create the high-compression PDF file, first, from an image (hereafter referred to as "the input image") Im0 to be processed, created are a first image layer (black character layer) Im1 that is a binary image of only the line drawing of black character, a second image layer (color character layer) Im2 that is a binary image of only the line drawing of color character, a third image layer (foreground layer) Im3 that is a multi-value image for expressing the character color (foreground) of the line drawing, and a fourth image layer (background layer) Im4 that is a multi-value image for expressing the pattern (background) other than the line drawing. Then, the first image layer Im1 and the second image layer Im2 are subjected to the compression processing that is suitable for compression of the line drawing, while the third image layer Im3 and the fourth image layer Im4 are subjected to the compression processing that is suitable for compression of the foreground (character color) or background. Subsequently, the first image layer Im1 having been compressed, the second image layer Im2 having been compressed, the third image layer Im3 having been compressed, and the fourth image layer Im4 having been compressed are, for example, integrated on one PDF image file, thereby creating a high-compression PDF file FIm corresponding to the input image Im0.

The compression processing applied to the first image layer Im1 and the second image layer Im2 may be implemented, for example, with an encoding scheme such as MMR for a binary image. The compression processing applied to the third image layer Im3 and the fourth image layer Im4 may be implemented, for example, with an encoding scheme such as JPEG for a multi-value image. The compression processing for the first image layer Im1 and the compression processing for the second image layer Im2 are common in being suitable for compression of the line drawing, and thus hereinafter will be collectively referred to as "the first compression processing." The compression processing for the third image layer Im3 and the fourth image layer Im4 is suitable for compression of the pattern and the background, and thus hereinafter will be referred to as "the second compression processing" so as to be distinguished from the first compression processing suitable for compression of the line drawing. Note that the aforementioned encoding schemes are an example, and thus an encoding scheme different from the aforementioned examples may also be employed for compression processing.

As described above, in the high-compression PDF technique, the input image Im0 to be processed is separated into the line drawing region and the other region such as the pattern and the background so as to perform the first compression processing on the line drawing region and the second compression processing on the other region of the pattern and the background other than the line drawing. This makes it possible to provide increased efficiency of compression. Here, the efficiency of compression is expressed by how much the compression rate is increased without impairing the image quality (reproducibility) at the time of reproducing the image. It can be thus said that if a high compression rate is implemented while maintaining reproducibility, the compression is performed with good efficiency.

The aforementioned high-compression PDF technique can be modified in various manners.

Next, the image compression processing in the image compression unit 52 will be described.

Figure 14:
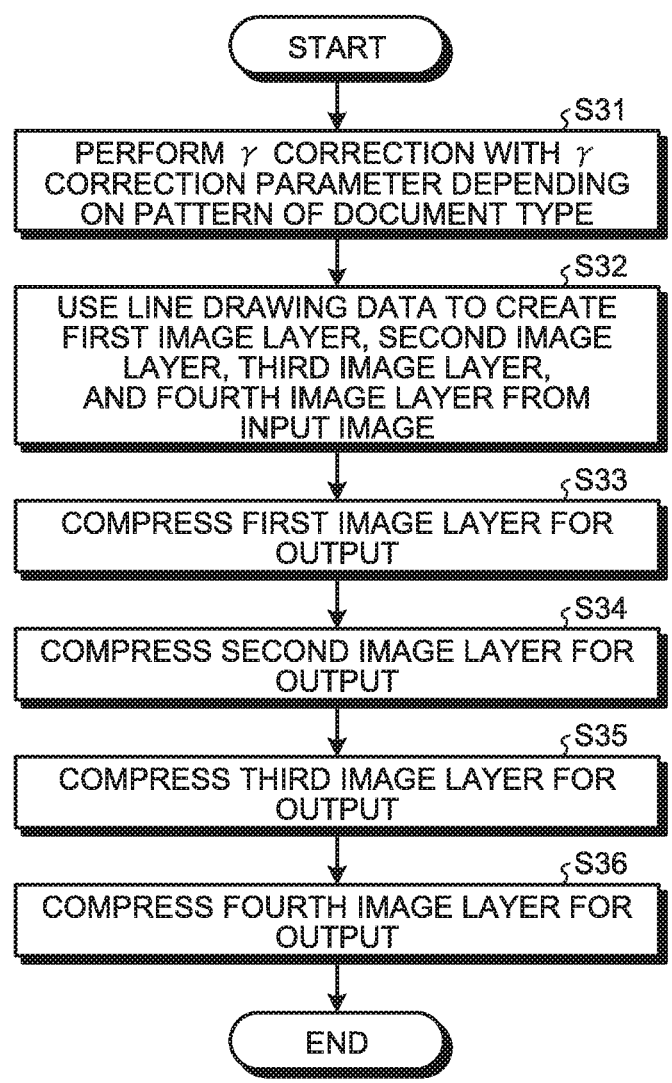
FIG. 14 is a flowchart illustrating an example flow of image compression processing in an image compression unit.

Here, FIG. 14 is a flowchart illustrating an example of the flow of the image compression processing in the image compression unit 52. As illustrated in FIG. 14, first, the image compression unit 52 performs the γ correction on a document (input image) with a γ correction parameter depending on the pattern of a document type (step S31).

Here, the relation between the pattern of a document type and the γ correction will be described. The background color will be increased in density by the γ correction in the following order.

Figure 15:
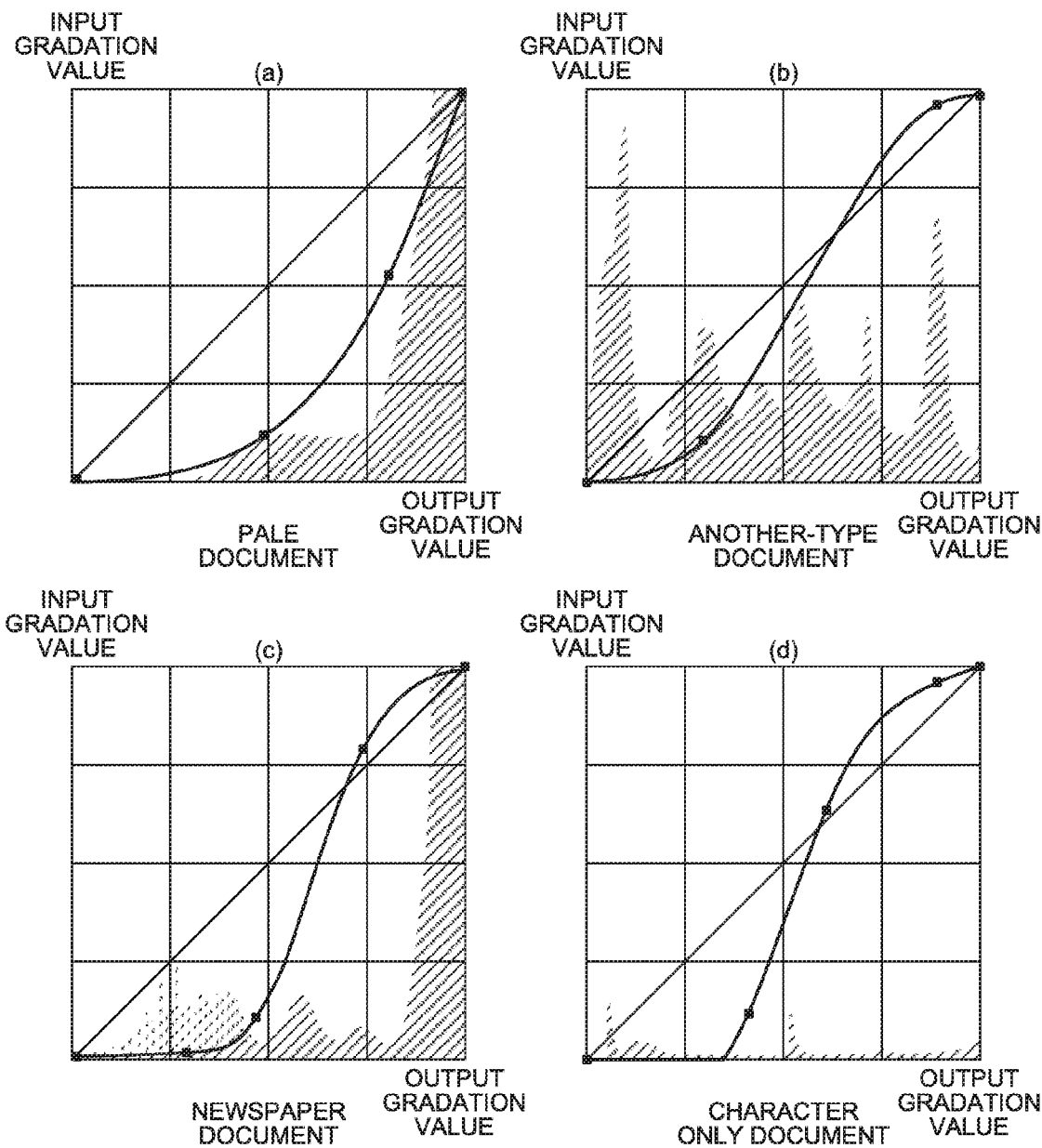
FIG. 15 is a view illustrating an example of a γ correction table for each document type.

Pale document>Another-type document>=Newspaper document with hollow character=Newspaper document with no hollow character>Character only document FIG. 15 is a view illustrating an example of the γ correction table that specifies the γ correction parameter of each document type.

1. Character Only Document

It is assumed that the character only document has only a low luminance color character on the white ground. Thus, for the character only document, employed is the γ correction table (see (d) of FIG. 15) that allows the background to be reduced in density and the character to be increased in density. This makes it possible to provide improved readability.

2. Newspaper Document with No Hollow Character

The newspaper document with no hollow character can be expected to have a newspaper ground in a high luminance color and a character in a low luminance color. Thus, for the newspaper document with no hollow character, employed is the γ correction table (see (c) of FIG. 15) that allows the background to be reduced in density and the character to be increased in density. This makes it possible to provide improved readability. However, the γ correction table to be used may be less strict than that for the character only document. In addition, when the user has specified to remove the background, the newspaper background may also be turned white while leaving only a character. This makes it possible to reduce toner when printing a PDF file, which is thus friendly to the environment.

3. Newspaper Document with Hollow Character

For the newspaper document with hollow character, employed is a γ correction table that turns a character like the hollow character to white. This makes it possible to provide improved readability to the hollow character. However, the γ correction table to be used may be less strict than that for the character only document.

4. Pale Document

For the pale document, employed is the γ correction table (see (a) of FIG. 15) that allows both the background and the character to be increased in density. This makes it possible to provide an improved appearance. At this time, it is characterized to be increased in density as compared with the another-type document.

5. Another-Type Document

For the another-type document, employed is the γ correction table (see (b) of FIG. 15) that allows the low luminance to be darker and the high luminance to be brighter. This makes it possible to provide a distinct difference in gradation between the background and the character, thereby allowing an improved appearance. However, to prevent damage to gradation, employed is a less strict γ correction table.

Then, after the γ correction is performed, the image compression unit 52 uses the line drawing data to create the first image layer, the second image layer, the third image layer, and the fourth image layer (step S32).

Figures 16, 17:
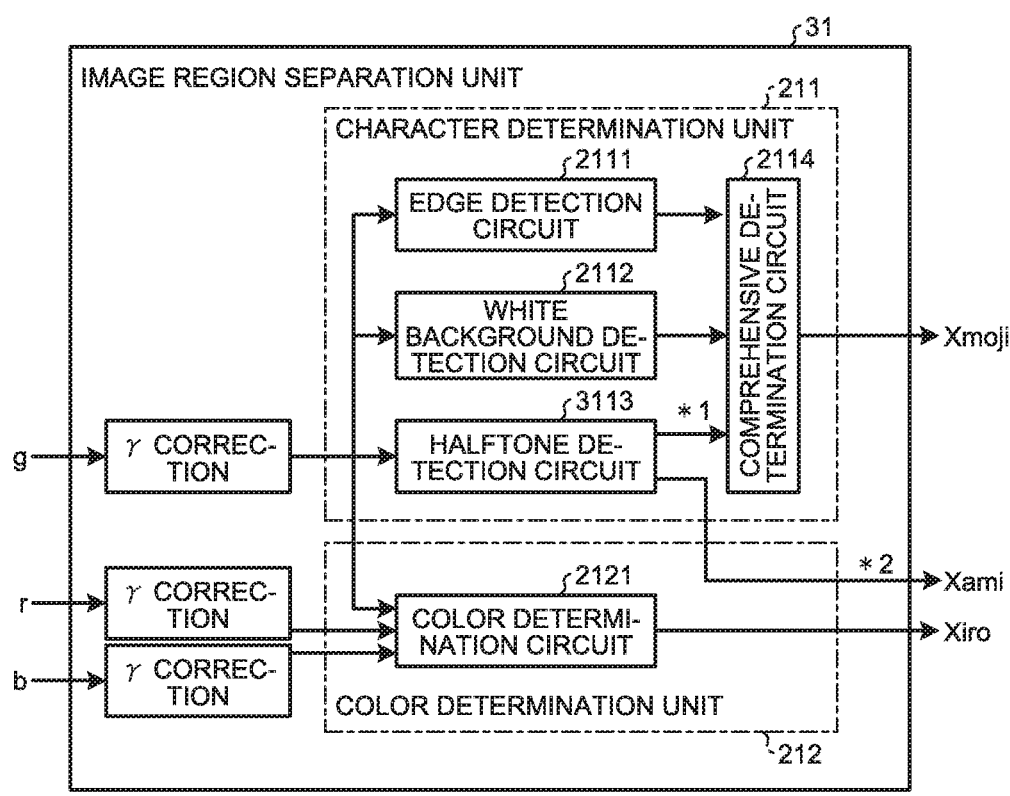
FIG. 16 is a view illustrating the resolution of each layer to be converted depending on the document type.
FIG. 17 is a block diagram illustrating a configuration of an image region separation unit according to a second embodiment.

Here, the relation between the pattern of a document type and the resolution will be described. FIG. 16 is a view illustrating the resolution of each layer to be converted depending on the document type. As illustrated in FIG. 16, the character only document and the newspaper document are increased in the compression of the image layer of the background (the fourth image layer). This takes advantage of the character only document and the newspaper document that may possibly not include a pattern and thus allow extraction of a character with high accuracy, so that an increase in the compression of the background would cause less influence on the image quality.

Note that it may also acceptable to reduce a file size not by switching the resolution in response to the document type but by changing the quality factor (QF) such as of JPEG depending on the document type.

Then, the image compression unit 52 performs reversible compression such as MMR or JBIG2 on the first image layer and the second image layer and outputs them (steps S33 and S34). The image compression unit 52 also performs non-reversible compression such as JPEG or JPEG2000 on the third image layer and the fourth image layer and outputs them (steps S35 and S36).

According to this embodiment described above, the document type of an input image is recognized by utilizing a histogram that is created by quantizing the pixel value of a focused pixel with a plurality of threshold values. As the preprocessing prior to the document type recognition, performed are the smoothing processing for removing halftone dots of a particular number of lines or greater in the pattern region and the edge enhancement processing in accordance with the amount of edge on the edge portion of the character region. This makes it possible to classify at least the four document types below in a simplified manner using the same determination scheme.

Character only document,
Newspaper document,
Pale document, and
Another-type document.

Furthermore, according to this embodiment, since the compression scheme of the compression processing for creating a high-compression image file is controlled in accordance with the recognized document type, it is possible to achieve high image quality, high compression, and high-speed compression.

This embodiment has described such an example as to control the processing at the time of creating the high-compression PDF file based on the result of a document type recognition. However, the embodiment is not limited thereto; that is, even when the scanner 1 is used to provide a copy image, the document type recognition unit 51 may be operated so as to use the result to control the color processing/UCR unit 24 or the printer correction unit 25 on the downstream side in the image processing apparatus 2. By way of example, when the document is determined to be the pale document, the printer correction unit 25 may perform the γ correction processing by which the image is increased in density (i.e., steep γ correction processing) when being reproduced. This also enables an improvement in the quality of images to be expected at the time of output by the printer.

Second Embodiment

Next, a second embodiment will be described. The same portions as those of the aforementioned first embodiment will be denoted with the same symbols and not be repeatedly explained.

The first embodiment employed a local smoothing filter in the smoothing circuit 221 to remove halftone. However, as long as the smoothing processing is locally performed, there exist halftone dots of the number of rough halftone lines that cannot be removed. The halftone has essentially a binary-like structure, and thus if the halftone is not perfectly removed, those pixels having an intermediate value in a histogram will be reduced in number, so that even a halftone pattern portion may be more likely determined to be the character region.

In this context, the second embodiment will be focused on the halftone pattern and, more particularly, on the feature of an intermediate portion in order to increase the accuracy of determining the character only document. Then, the second embodiment is different from the first embodiment in that when there positively exists a halftone pattern, the document is not determined to be the character only document irrespective of the result of a histogram.

FIG. 17 is a block diagram illustrating a configuration of an image region separation unit 31 according to the second embodiment. The image region separation unit 31 of this embodiment illustrated in FIG. 17 performs a region separation on the data having been read by the scanner 1 (r, g, and b signals each having 8 bits after A/D conversion; reflectivity linear signals). The output X from the image region separation unit 31 is a 3-bit signal; that is, a character/non-character region signal, a color/non-color region signal, and a halftone/non-halftone region signal for document type recognition.

The image region separation unit 31 has a halftone detection circuit 3113 which outputs, to the filtering unit 22, a determination result $X_{ami}$ indicating a halftone separation result 2 to be reflected on the document type recognition in addition to the output (a halftone separation result 1) to the comprehensive determination circuit 2114 described in the first embodiment. The purpose of the halftone separation result 1 is to detect the entire halftone region, that is, the region made up of halftone dots. The purpose of the halftone separation result 2 is to detect a halftone region having a halftone rate near 50% that is few in the halftone character but many in the halftone pattern.

Figure 18:
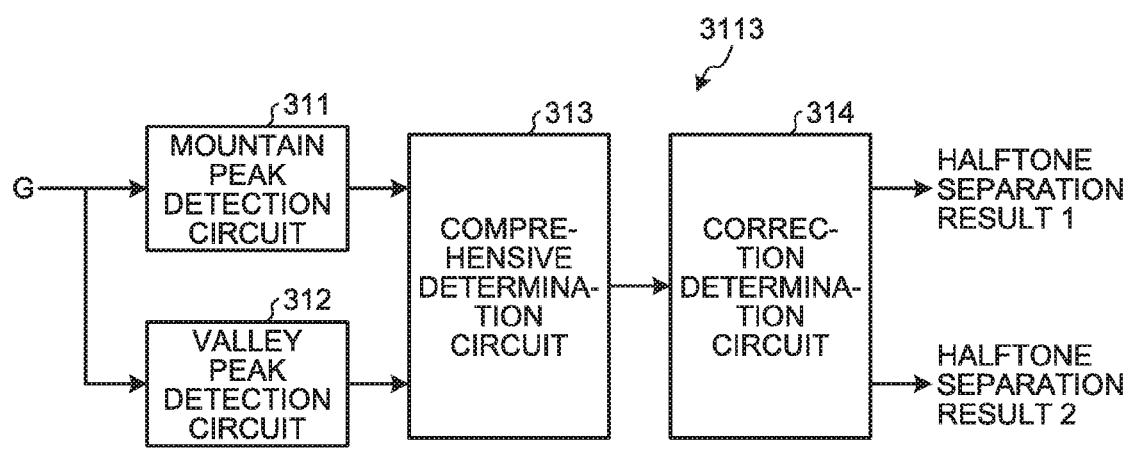
FIG. 18 is a block diagram illustrating a configuration of a halftone detection circuit.

Here, the halftone detection circuit 3113 will be detailed below. FIG. 18 is a block diagram illustrating the configuration of the halftone detection circuit 3113. As illustrated in FIG. 18, the halftone detection circuit 3113 is provided with a mountain peak detection circuit 311, a valley peak detection circuit 312, a comprehensive determination circuit 313, and a correction determination circuit 314.

First, the output of the halftone separation result 1 will be described.

As illustrated in FIG. 18, the mountain peak detection circuit 311 and the valley peak detection circuit 312 sequentially apply a matrix as illustrated in (a) to (c) of FIG. 3, that is, the 3×3 pixel matrix (M=3), the 4×4 pixel matrix (M=4), or the 5×5 pixel matrix (M=5) from a density linear signal G after the γ correction so as to detect whether the center pixel of the matrix $m_0$ (see (a) to (c) of FIG. 3 is an extreme (a mountain peak pixel or a valley peak pixel) indicative of a mountain or a valley of a density change, based on the relation with the densities of the surrounding pixels $m_1$ to $m_i$. At this time, the threshold value to be used for detection is Δmth1.

Next, the comprehensive determination circuit 313 divides an image in the unit of block B of N×N pixels (where N>M), for example, block B of 9×9 pixel size (N=9) as illustrated in FIG. 4.

Then, the comprehensive determination circuit 313 counts, for each block, each of the number of extreme pixels indicative of a mountain (the number of mountain peak pixels) and the number of extreme pixels indicative of a valley (the number of valley peak pixels), and determines the number of extreme pixels having a greater count as the number of extreme pixels of the block. Subsequently, from the relation between the number of extreme pixels $P_0$ of the focused block $B_0$ illustrated in FIG. 5 and the number of extreme pixels P of each of the surrounding vertical, horizontal, and diagonal blocks $B_1$ to $B_8$ that surround the block $B_0$, the halftone detection circuit 2113 determines whether the center pixel $n_0$ of the focused block $B_0$ (see FIG. 4) or all the pixels $n_0$ to $n_{80}$ within the focused block $B_0$ belong to the halftone region. That is, based on the number of extremes of the focused block and each of the surrounding blocks, the correction determination circuit 314 determines whether the focused block is a halftone block, and then outputs the halftone separation result 1.

Next, the output of the halftone separation result 2 will be described.

Here, a description will be made to the features of the halftone character (which can be included in a document to be determined as the character only document) and the halftone pattern.

1. Halftone Character
   Having a small two-dimensional spread (typically reduced in width because it is a character)
   Having a low possibility of including an intermediate density (the possibility of locally including a mountain peak pixel and a valley peak pixel at the same time is low).
2. Halftone Pattern
   Having a two-dimensional spread (typically wide because it is a picture)

Having a high possibility of including an intermediate density.

In this embodiment, a description will be made to an example of the processing for detecting a halftone block or part of a halftone pattern based on the features of the halftone character and the halftone pattern mentioned above. Note that this embodiment is based on the concept that the number of halftone characters of a checker shape (halftone rate 50%) is small and even if any, the character may have a small area.

To acquire the halftone separation result 2, the mountain peak detection circuit 311 and the valley peak detection circuit 312 switch, to Δmth2 (Δmth2>Δmth1), the threshold value used for detection of an extreme (the mountain peak pixel or the valley peak pixel) indicative of a mountain or a valley of a density change. The threshold value is changed in this manner because the halftone near an intermediate density has a greater mountain height or valley depth as compared with a highlight portion or a dark portion, respectively, and thus the halftone near an intermediate density is restricted.

For the halftone near an intermediate density, the numbers of mountain peaks and valley peaks are generally equal to each other. In this context, to acquire the halftone separation result 2, the comprehensive determination circuit 313 performs the conventional extreme computation only when the difference between the number of mountain peaks and the number of valley peaks meets the condition, whereas when the condition is not met, the number of extremes may be outputted as "0".

Alternatively, to acquire the halftone separation result 2, the comprehensive determination circuit 313 may determine the average value of the signals G of the focused block (8×8 pixels), and when the average value lies within a certain range, the focused block may be determined as the intermediate density block and the conventional extreme computation may be performed only in this case. When this is not satisfied, the number of extremes may be outputted as "0."

The halftone pattern exists in a wider area as compared with the halftone character. In this context, to acquire the halftone separation result 2, the correction determination circuit 314 switches the threshold value to be employed to a threshold value greater than that at the time of the conventional halftone separation result 1.

Figure 19:
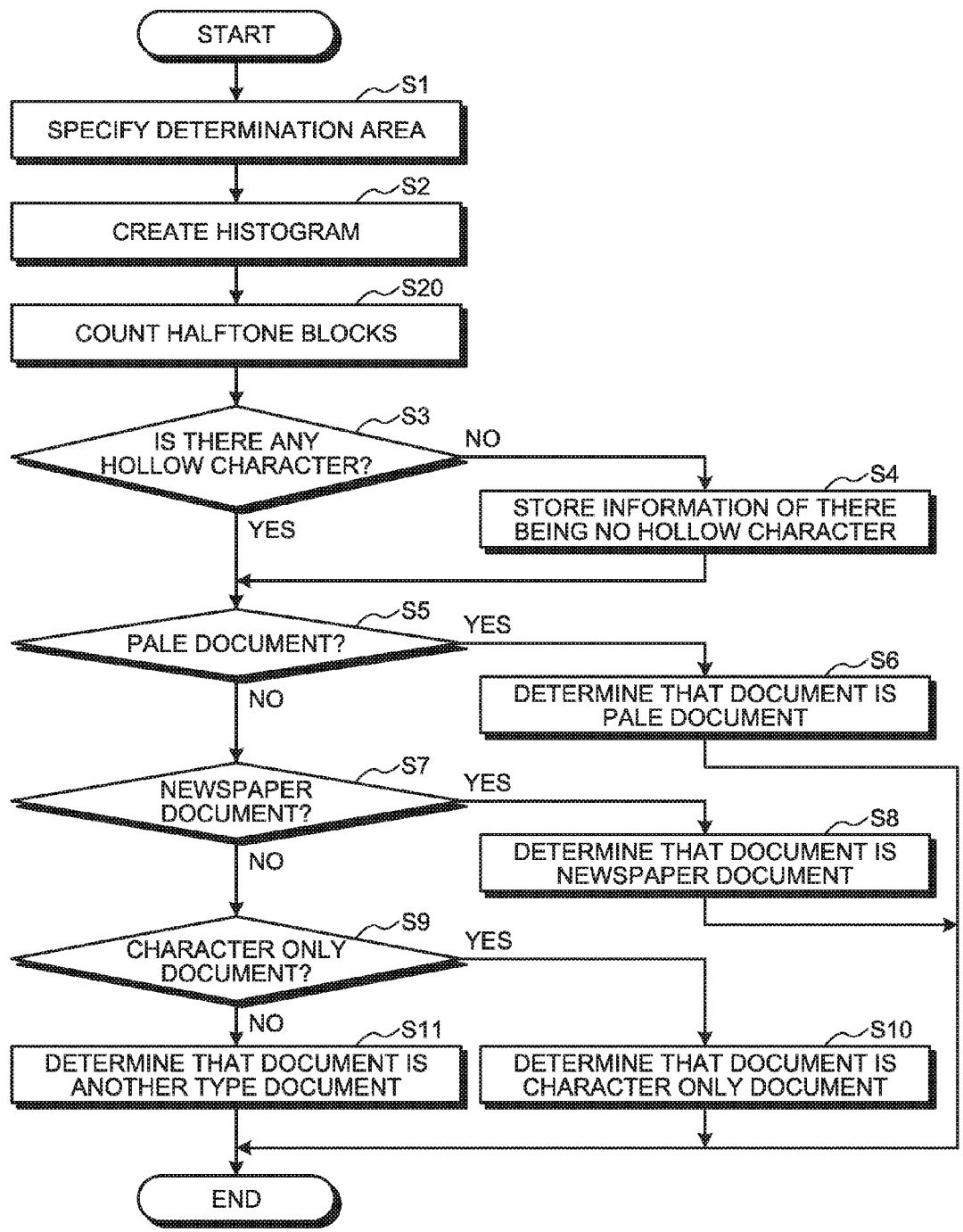
FIG. 19 is a flowchart schematically illustrating the flow of document type recognition processing in a document type recognition unit.

Next, a description will be made to the processing of the document type recognition unit 51 in the image compression processing apparatus 5 of this embodiment. FIG. 19 is a flowchart schematically illustrating the flow of the document type recognition processing in the document type recognition unit 51.

After the creation of a histogram (step S2), the document type recognition unit 51 counts halftone blocks (step S20). More specifically, in step S20, the document type recognition unit 51 counts the number of active blocks of the determination result $X_{ami}$.

Then, in the determination as to whether the document in step S9 is the character only document, the document type recognition unit 51 may determine that the document is not the character only document when the count is a predetermined number or greater.

That is, as illustrated in the flowchart of FIG. 19, if a halftone intermediate density portion is included when the document is not the pale document (No in step S5) and not the newspaper document (No in step S7), the document may be determined not to be the character only document (No in step S9) and thus determined to be the another-type document (step S11).

According to this embodiment described above, when the input image includes a predetermined number of halftone pattern regions or greater, the input image is recognized, as a document type that includes a pattern, irrespective of the recognition result using a histogram. This makes it possible to distinguish "the character only document" from another document with higher accuracy. Concerning the determination of "the character only document," a halftone having a large size that cannot be smoothed out in the smoothing processing may resemble a character, and thus would be determined to be the character only document even in the presence of a halftone pattern. However, the accuracy for determination of "the character only document" can be increased because the halftone pattern region is actively determined.

Third Embodiment

Next, a third embodiment will be described. The same portions as those of the first embodiment or the second embodiment mentioned above will be denoted with the same symbols and will not be repeatedly explained.

In the third embodiment, "the pale document" is further classified into patterns so as to provide control to the compression scheme for each pattern.

Figure 20:
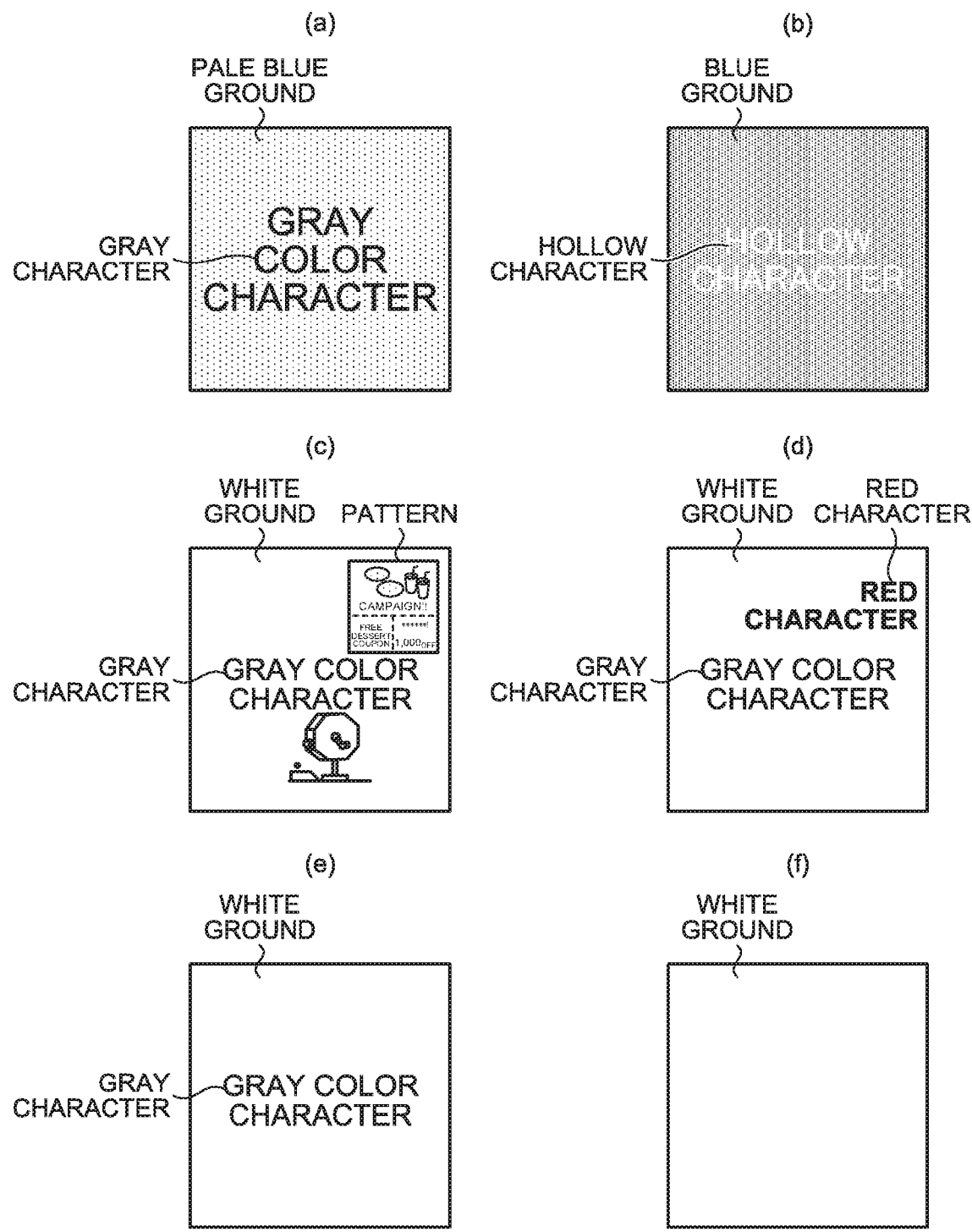
FIG. 20 is a view illustrating a pattern example of a "pale document" to be determined by a document type recognition unit.

FIG. 20 is a view illustrating an example of patterns of "the pale document" to be determined by the document type recognition unit 51 according to the third embodiment. As illustrated in FIG. 20, the document type recognition unit 51 further classifies the pale document into the following patterns.

Pale document (a): Color ground (3. Neutral color, 4. Newspaper ground color) occupies a large portion with no hollow character (5. White color is at a threshold value or below).

Pale document (b): Color ground (3. Neutral color, 4. Newspaper ground color) occupies a large portion with the hollow character (5. White color is at a threshold value or above)

Pale document (c): It cannot be determined whether it has a color ground or white ground, or there are a number of colors due to a pattern.

Pale document (d): White ground (5. White color) occupies a large portion, and the number of colors is two (gray+another color).

Pale document (e): White ground occupies a large portion, and the number of colors other than white is only one.

Pale document (f): White paper document or generally white paper document (for example, with several characters).

The document type recognition unit 51 switches the binarizing scheme and the threshold value for the pale document depending on the pattern. Here, a description will be made to the dynamic threshold value binarization by taking, as an example, the technique of separating a pixel as a line drawing candidate pixel if the difference between average gradation values of surrounding pixels is equal to or greater than a threshold value.

For Pale documents (a) and (b), it can be expected that there is no difference in gradation between the background and the line drawing. Thus, for Pale documents (a) and (b), the document type recognition unit 51 employs a dynamic threshold value binarization of a significantly low threshold value. More specifically, this threshold value allows asperities, if any, to be accepted as much as possible.

For Pale document (c), it can be expected that there is some difference in gradation between the background and the line drawing. Thus, for Pale document (c), the document type recognition unit 51 employs a dynamic threshold value binarization of a low threshold value.

Pale documents (d) and (e), it can be expected that there is a significant difference in gradation between the background and the line drawing. Thus, for Pale documents (d) and (e), the document type recognition unit 51 employs a fixed threshold value binarization of such a threshold value as to use the valley of a histogram. In addition, Pale documents (d) and (e), the number of colors need to be taken into consideration to distinguish the documents from Pale document (c). Thus, to determine the color for each line drawing, the document type recognition unit 51 counts the number of colors of the entire document, thereby enabling the determination of Pale documents (d) and (e). As a matter of course, for Pale document (d), only two colors may also be employed for the line drawing in the entire document for each color. Furthermore, for Pale document (e), only one color may also be employed for the line drawing in the entire document.

For Pale document (f), although it can be expected that there is a significant difference in gradation between the background and the line drawing, there is possibly no histogram valley. Thus, for Pale document (f), the document type recognition unit 51 employs a fixed threshold value binarization of such a threshold value as to allow the document to be determined to be other than white.

Next, a description will be made to the compression processing on the example of a pattern of "the pale document" in the image compression unit 52.

The image compression unit 52 performs the γ correction on a document. The image compression unit 52 switches the γ correction parameter depending on the pattern of the pale document type. Now, a description will be made to the purpose of the γ correction depending on the pattern of the pale document type.

Figure 21:
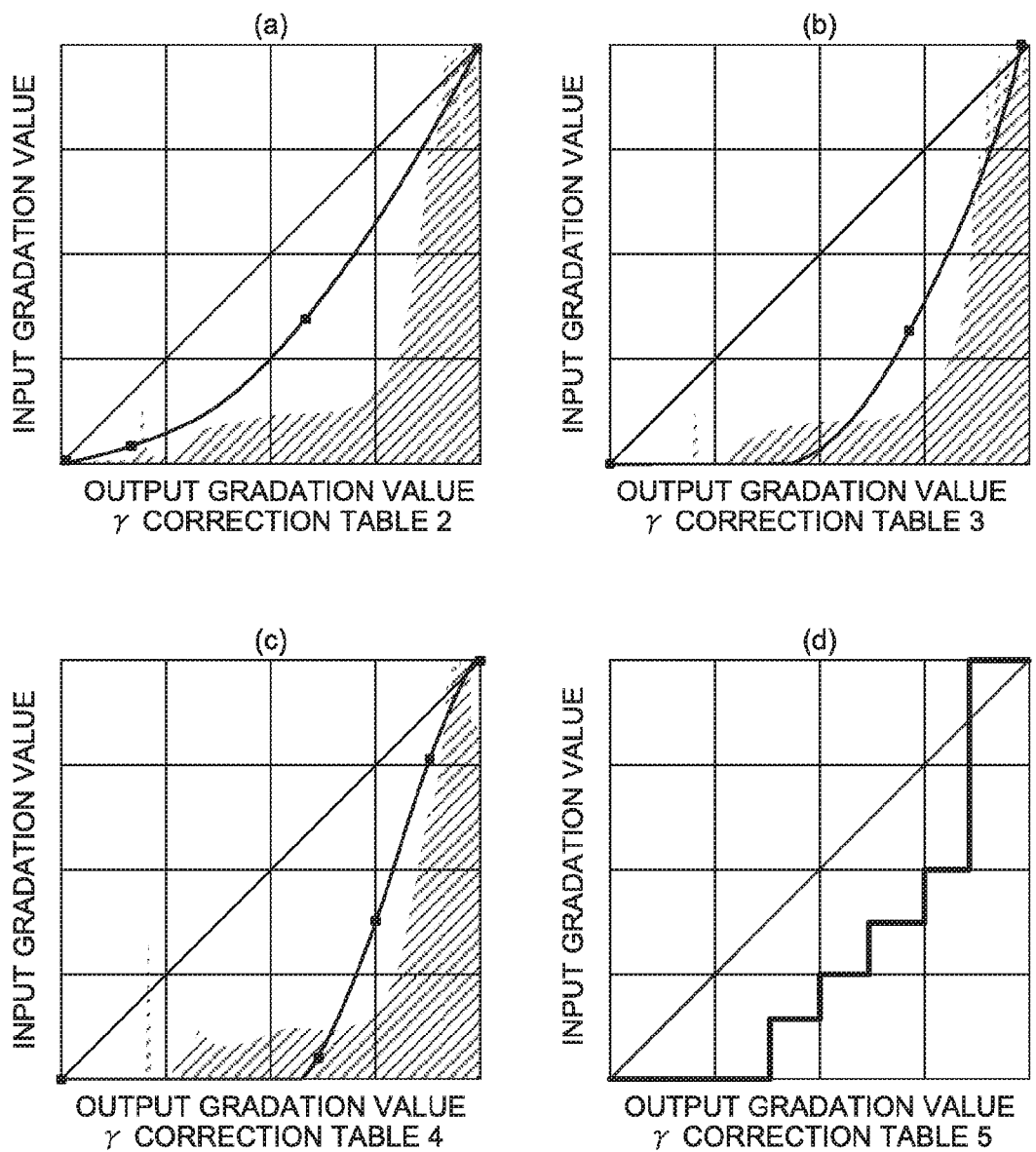
FIG. 21 is a view illustrating an example of a γ correction table for each pale document type pattern.

FIG. 21 is a view illustrating an example of the γ correction table for specifying the γ correction parameter of each pattern of the pale document type.

Pale Documents (a) and (b)

Since there is a small amount of white color in the document, use of the γ correction table 3 of FIG. 21 would cause an increase in file size. Therefore, the γ correction table 2 is used. The γ correction tables 2, 3, and 4 will increase darkness as a whole. The greater the number, the darker the document becomes.

Pale Document (c)

Since there is a significantly large number of white color regions, even use of the γ correction table 3 of FIG. 21 would not cause an increase in file size. Therefore, the γ correction table 3 is used. On the other hand, it is also acceptable to calculate the γ correction table for Pale documents (a), (b), and (c) depending on the number of pixels of the white color regions to thereby restrict variations in file size.

Pale Document (d)

Since the document has a white ground and is easy to separate the character from the background, even use of the γ correction table 4 would not cause an increase in file size.

Pale Document (e)

Since the document is much easier to separate the character from the background as compared with Pale document (d), a table that increases density as compared with the γ correction table 4 may be employed, whereas when only a white ground is left in the background, the entire background may also be turned to white.

Pale Document (f)

When only a white ground is left in the background, the entire background may be turned to white. On the other hand, as in the γ correction table 5, the gradation property may also be decreased to thereby decrease the file size. The γ correction table 5 is to decrease the gradation property and imaged to be in a stepwise shape. There is a tradeoff relation between the gradation property and the file size.

Next, a description will be made to the relation between each pattern and the resolution of the pale document type in the image compression unit 52. FIG. 22 is a view illustrating the resolution of each layer to be converted depending on each pattern of the pale document type. As illustrated in FIG. 22, for Pale documents (a), (b), and (c), the image compression unit 52 cannot significantly reduce the resolution of the background because of a high possibility of including a pattern. For Pale document (d), the image compression unit 52 slightly reduces the resolution of the background because of a high possibility of including a pattern. For Pale documents (e) and (f), the image compression unit 52 significantly reduces the resolution of the background because of a low possibility of including a pattern.

Furthermore, for Pale document (d) and (e), it is possible that not a black character but only a color character exists. For Pale documents (d) and (e), the image compression unit 52 may not use the black character layer but only the color character layer. Therefore, the PDF may be switched from the four-layer to the three-layer to thereby reduce the file size.

Furthermore, for Pale document (e), it is possible that not a color character but only a black character exists. For Pale document (e), the image compression unit 52 may use not the color character layer but only the black character layer. Therefore, the PDF may be switched from the four-layer to the three-layer to thereby reduce the file size. Furthermore, since the black character can be printed with the K single color, it can be achieved to reduce the amount of toner for printing the PDF file.

For the image compression of the pale document, the embodiment described above makes it possible to reduce the file size as compared with a simple correction by an automatic density correction using, for example, a luminance value.

FIG. 23 is a block diagram illustrating an example hardware configuration of the image forming apparatus 100. The image forming apparatus 100 described in the first to third embodiments above is provided, for example, as illustrated in FIG. 23, with a controller 210, an operation panel 220, a facsimile control unit (FCU) 230, a universal serial bus (USB) device 240, a media link board (MLB) 250, the scanner 1, and the plotter 4.

The operation panel 220 is a user interface on which the user using the image forming apparatus 100 enters various settings or various pieces of information to be presented to the user are displayed. For example, the aforementioned mode of operation is selected by the user on the operation panel 220.

The FCU 230 is a control unit for controlling the facsimile function of the image forming apparatus 100. The USB device 240 is connected to the image forming apparatus 100 via a USB. The MLB 250 is a conversion board for format conversion of image data. The scanner 1 is an engine for reading a document, and the plotter 4 is an engine for printing. In this embodiment, it is to be understood that a document is read by the scanner 1 to thereby acquire an image to be processed.

The controller 210 controls the operation of the image forming apparatus 100. The controller 210 is provided, as illustrated in FIG. 23, with a central processing unit (CPU) 216, a system memory 213, the HDD 3, a physical layer (PHY: the physical layer of a communication system circuit) 214, and an application specific integrated circuit (ASIC) 215. The operation panel 220 is connected to the ASIC 215 of the controller 210. Furthermore, the FCU 230, the USB device 240, the MLB 250, the scanner 1, and the plotter 4 are connected to the ASIC 215 of the controller 210 via a data transfer bus 280.

In the image forming apparatus 100 described in the first to third embodiments, a part or all of the components functioning as the aforementioned image processing apparatus will be implemented mainly by the controller 210. That is, among the functional components described in the first to third embodiments, the image processing apparatus 2 is implemented, for example, by the ASIC 215 of the controller 210. Furthermore, the image compression processing apparatus 5 is implemented, for example, by the CPU 216 of the controller 210 executing a predetermined program (software) by using the system memory 213.

Note that the aforementioned program is recorded in a form of an installable file or an executable file on a computer readable recording medium such as a CD-ROM, flexible disk (FD), CD-R, or DVD so as to be provided to the image forming apparatus 100. Furthermore, the aforementioned program may also be stored on a computer connected to a network such as the Internet so as to be provided to the image forming apparatus 100 by being downloaded through the network. Furthermore, the aforementioned program may also be provided or distributed through a network such as the Internet. Furthermore, for example, the aforementioned program may also be provided by being incorporated in advance into the system memory 213 or the HDD 3 in the image forming apparatus 100.

Furthermore, in the aforementioned first to third embodiments, such an example as to implement the image forming apparatus 100 as a single system was assumed. However, the functional components of the image forming apparatus 100 may also be distributed to a plurality of physically separated devices, so that these plurality of devices cooperate to implement the operation as the image forming apparatus 100.

Note that in the aforementioned first to third embodiments, such an example was described in which the document type recognition apparatus of the present invention is applied to a multifunctional apparatus that has at least two of the copy function, the printer function, the scanner function, and the facsimile function. However, the document type recognition apparatus can also be applied to any device so long as the device is an image forming apparatus such as a copier, a printer, a scanner device, or a facsimile device.

According to the present invention, the document type recognition of an input image is performed by utilizing a histogram created by quantizing the pixel value of a focused pixel with a plurality of threshold values. As the preprocessing, the smoothing processing is performed to remove halftone dots of a particular number of lines or greater in a pattern region, and the edge enhancement processing is applied to the edge portion of a character region depending on the amount of edge. Thus, for example, the invention provides the effect that the four document types below can be classified in a simplified configuration using the same determination scheme:

Character only document,
Newspaper document,
Pale document, and
Another-type document.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. A document type recognition apparatus comprising:
a memory having computer-readable instructions stored thereon; and
at least one processor communicatively coupled to the memory and configured to execute the computer-readable instructions to separate an input image into a character region and a pattern region, the separation including generating a signal indicative of an edge region based on an amount of edge;

perform smoothing processing to remove halftone dots of a particular number of lines or greater in the pattern region;

generate an enhanced image by performing edge enhancement processing based on the amount of edge on an edge portion of the character region after the smoothing processing has been performed;

create a density histogram of the enhanced image while excluding a pixel corresponding to the signal from the enhanced image when the signal indicates that the edge region is active; and recognize a document type of the input image and a presence of a hollow character, the document type being recognized by utilizing the density histogram, and the presence of the hollow character being recognized based on the exclusion of the pixel.

2. The document type recognition apparatus according to claim 1, wherein the at least one processor is further configured to recognize the document type based on a comparison of the density histogram with a predetermined density threshold value.

3. The document type recognition apparatus according to claim 1, wherein the at least one processor is further configured to separate the input image by detecting, from the input image, a halftone pattern region of a particular halftone rate that is few in a halftone character but many in a halftone pattern; and determine that the document type of the input image includes a pattern irrespective of the recognition when a number of halftone pattern regions included in the input image is a predetermined number or greater.

4. The document type recognition apparatus according to claim 3, wherein the particular halftone rate is 50%.

5. The document type recognition apparatus according to claim 1, wherein the document type includes at least one of a character only document, a newspaper document, and a pale document that is an image output in a toner save mode.

6. An image forming apparatus comprising:
an image forming unit; and
the document type recognition apparatus according to claim 1.

7. A document type recognition method performed in a document type recognition apparatus, the method comprising:

separating an input image into a character region and a pattern region, the separating including generating a signal indicative of an edge region based on an amount of edge;

performing smoothing processing to remove halftone dots of a particular number of lines or greater in the pattern region;

generating an enhanced image by performing edge enhancement processing based on the amount of edge on an edge portion of the character region after the smoothing processing has been performed;

creating a density histogram of the enhanced image while excluding a pixel corresponding to the signal from the enhanced image when the signal indicates that the edge region is active; and recognizing a document type of the input image and a presence of a hollow character, the document type being recognized by utilizing the density histogram, and the presence of the hollow character being recognized based on the exclusion of the pixel.

8. The document type recognition method according to claim 7, wherein the recognizing includes recognizing the document type based on a comparison of the density histogram with a predetermined density threshold value.

9. The document type recognition method according to claim 7, wherein the separating includes detecting, from the input image, a halftone pattern region of a particular halftone rate that is few in a halftone character but many in a halftone pattern, and the method further comprises determining that the document type of the input image includes a pattern irrespective of the recognizing when a number of halftone pattern regions included in the input image is a predetermined number or greater.

10. The document type recognition method according to claim 9, wherein the particular halftone rate is 50%.

11. The document type recognition method according to claim 7, wherein the document type includes at least one of a character only document, a newspaper document, and a pale document that is an image output in a toner save mode.

12. A non-transitory computer-readable medium including programmed instructions that, when executed by at least one processor, cause the at least one processor to separate an input image into a character region and a pattern region, the separation including generating a signal indicative of an edge region based on an amount of edge;

perform smoothing processing to remove halftone dots of a particular number of lines or greater in the pattern region;

generate an enhanced image by performing edge enhancement processing based on the amount of edge on an edge portion of the character region after the smoothing processing has been performed;

create a density histogram of the enhanced image while excluding a pixel corresponding to the signal from the enhanced image when the signal indicates that the edge region is active; and recognize a document type of the input image and a presence of a hollow character, the document type being recognized by utilizing the density histogram, and the presence of the hollow character being recognized based on the exclusion of the pixel.

13. The non-transitory computer-readable medium according to claim 12, wherein the programmed instructions, when executed by the at least one processor, further cause the at least one processor to recognize the document type based on a comparison of the density histogram with a predetermined density threshold value.

14. The non-transitory computer-readable medium according to claim 12, wherein programmed instructions, when executed by the at least one processor, further cause the at least one processor to separate the input image by detecting, from the input image, a halftone pattern region of a particular halftone rate that is few in a halftone character but many in a halftone pattern; and determine that the document type of the input image includes a pattern irrespective of the recognition when a number of halftone pattern regions included in the input image is a predetermined number or greater.

15. The non-transitory computer-readable medium according to claim 14, wherein the particular halftone rate is 50%.

* * * * *